United States Patent
Long

(10) Patent No.: US 8,069,309 B1
(45) Date of Paten: Nov. 29, 2011

(54) SERVICING MEMORY IN RESPONSE TO SYSTEM FAILURE

(75) Inventor: Matthew Long, Uxbridge, MA (US)

(73) Assignee: EMC Corporation, Hopkinton, MA (US)

( * ) Notice: Subject to any disclaimer, the term of this patent is extended or adjusted under 35 U.S.C. 154(b) by 144 days.

(21) Appl. No.: 11/477,301

(22) Filed: Jun. 29, 2006

(51) Int. Cl.
G06F 12/12 (2006.01)

(52) U.S. Cl. .. 711/118; 711/156; 711/154; 711/E12.075

(58) Field of Classification Search .................. None
See application file for complete search history.

(56) References Cited

U.S. PATENT DOCUMENTS

| | | | | |
|---|---|---|---|---|
| 5,835,761 A | * | 11/1998 | Ishii et al. | 713/100 |
| 6,336,174 B1 | * | 1/2002 | Li et al. | 711/162 |
| 2003/0188231 A1 | * | 10/2003 | Cronce | 714/52 |

* cited by examiner

*Primary Examiner* — Kevin Verbrugge
*Assistant Examiner* — Eric Loonan
(74) *Attorney, Agent, or Firm* — Krishnendu Gupta; Jason A. Reyes; Deepika Bhayana

(57) ABSTRACT

Memory is serviced. In response to an input indicating a serious condition, a service is invoked that is unaffected by the serious condition. By the service, it is determined whether other instructions are available to be executed that are not being affected by the serious condition. By the other instructions, data is copied from a write cache to a nonvolatile memory before the data is lost from the write cache.

16 Claims, 3 Drawing Sheets

SERVICING MEMORY IN RESPONSE TO SYSTEM FAILURE

BACKGROUND

One conventional data storage system includes a storage processor, an array of magnetic disk drives and a backup power supply. The storage processor carries out a variety of data storage operations on behalf of an external host device (or simply host). In particular, the storage processor temporarily caches host data within its storage cache and, at certain times, de-stages that cached data onto the array of magnetic disk drives. If the data storage system is set up so that it acknowledges write requests from the host once the data reaches the storage cache rather than once the data reaches the array of magnetic disk drives, the host will enjoy shorter transaction latency.

In a typical computing system including a typical data storage system, different types of serious failures may occur, such as power failures, software crashes, or critical hardware failures in components such as disk drives, a fan, a power supply, a central processing unit (CPU) or memory boards, or an I/O bus.

Some data storage systems employ backup power supplies to prevent the loss of data from the storage caches in the event of power failures. For example, suppose that such a data storage system loses its steady state source of electrical power (e.g., power from the street) during operation. In such a situation, a set of backup power supplies provides reserve power to the storage processor and to a persistent storage device (e.g., the array of magnetic disk drives) for a short period of time (e.g., 30 seconds). During this time, the storage processor writes the data from its storage cache onto the persistent storage device so that any data which has not yet been properly de-staged is not lost. Once power from the main power feed returns, the storage processor loads the data from the persistent storage device back into the storage cache. At this point, the data storage system is capable of continuing normal operation.

Typically in a computing system a non-maskable interrupt (NMI) or system management interrupt (SMI) can be generated to handle a serious failure. When an SMI or NMI is asserted, the CPU is aware that a catastrophic failure has occurred which necessitates the shut-down of the system. Other types of failures such as an address parity error may cause the NMI to be asserted to the CPU.

When the CPU receives the SMI signal, the CPU operation mode shifts to a system management mode (to be referred to as an SMM hereinafter) to start an interrupt control process stored in the system's BIOS-ROM. The interrupt control process executes an interrupt control process corresponding to the interrupt signal requested from the CPU.

In a CPU available from Intel Corp., U.S.A., the SMM means a CPU operation mode set in shift of the CPU to the interrupt control process in the BIOS-ROM when an SMI# signal is input from the computer system to the CPU.

While the CPU is in the SMM, no computer system can request a new interrupt (e.g., IRQ, INTR, or SMI) from the CPU. The interrupt control process must directly execute a series of processes.

SUMMARY

Memory is serviced. In response to an input indicating a serious condition, a service is invoked that is unaffected by the serious condition. By the service, it is determined whether other instructions are available to be executed that are not being affected by the serious condition. By the other instructions, data is copied from a write cache to a nonvolatile memory before the data is lost from the write cache.

One or more embodiments of the invention may provide one or more of the following advantages.

In the event of a serious failure, a useful task may be executed to avoid excessive loss as a result of the failure. For example, data that might otherwise be lost can be saved.

BRIEF DESCRIPTION OF THE DRAWINGS

The foregoing and other features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

As described below, a high priority service routine running on a main CPU can be used to backup memory or write cache to a persistent storage device. For example, the high priority routine can be triggered by a power failure, a panic procedure, or a watchdog timeout. In such a case, as a result, a RESET, SMI, or NMI signal may be asserted, thus invoking BIOS, SMI, or NMI code. Execution of this code causes data to be copied from memory or write cache to a persistent storage device such as a flash or disk device. The copying is executed at a CPU primitive level that is independent of normal operating code. It is expected that the memory or write cache is preserved for at least the duration of the copying. The copy may be done either as a raw copy of a well known region of memory or in a context sensitive way, making use of one or more common structures set up by the normal operating code as part of normal operation. This technique also provides cost savings by using the main CPU to do the copying, and provides significant isolation from normal operating code such that panic procedures and at least some hardware fault based system halts do not cause a loss of data, even on a non-redundant storage processor.

In particular, a volatile (i.e., nonpersistent) memory based write cache is used in a data storage system to improve the performance of the system. If the data storage system loses its steady state source of electrical power (i.e., has a power failure), the data in the write cache is lost unless it is saved to a persistent storage device (e.g., a flash memory or a magnetic hard disk) before the data storage system is completely out of energy.

A conventional data storage system invokes ordinary software routines to save the write cache data to the persistent storage device. These ordinary software routines are not able to function if the system's operating system software ceases to function. For example, if the system loses access to its hard disks (e.g., due to a power failure or disk failure), the system's operating system software is likely to cease to function (especially if the software relies on memory paged to disk), and therefore cannot be used to help save the write cache data.

The techniques described herein rely, in at least some implementations, on software that is independent of the normal operating software including high priority service routines to save the write cache data to the persistent storage device. Since the software is independent of normal operating software and is invoked by a high priority interrupt such as an NMI, SMI, or RESET, it can successfully save the data when system or paging disks fail, or when the normal operating software enters a panic condition or hangs.

Figure 1:
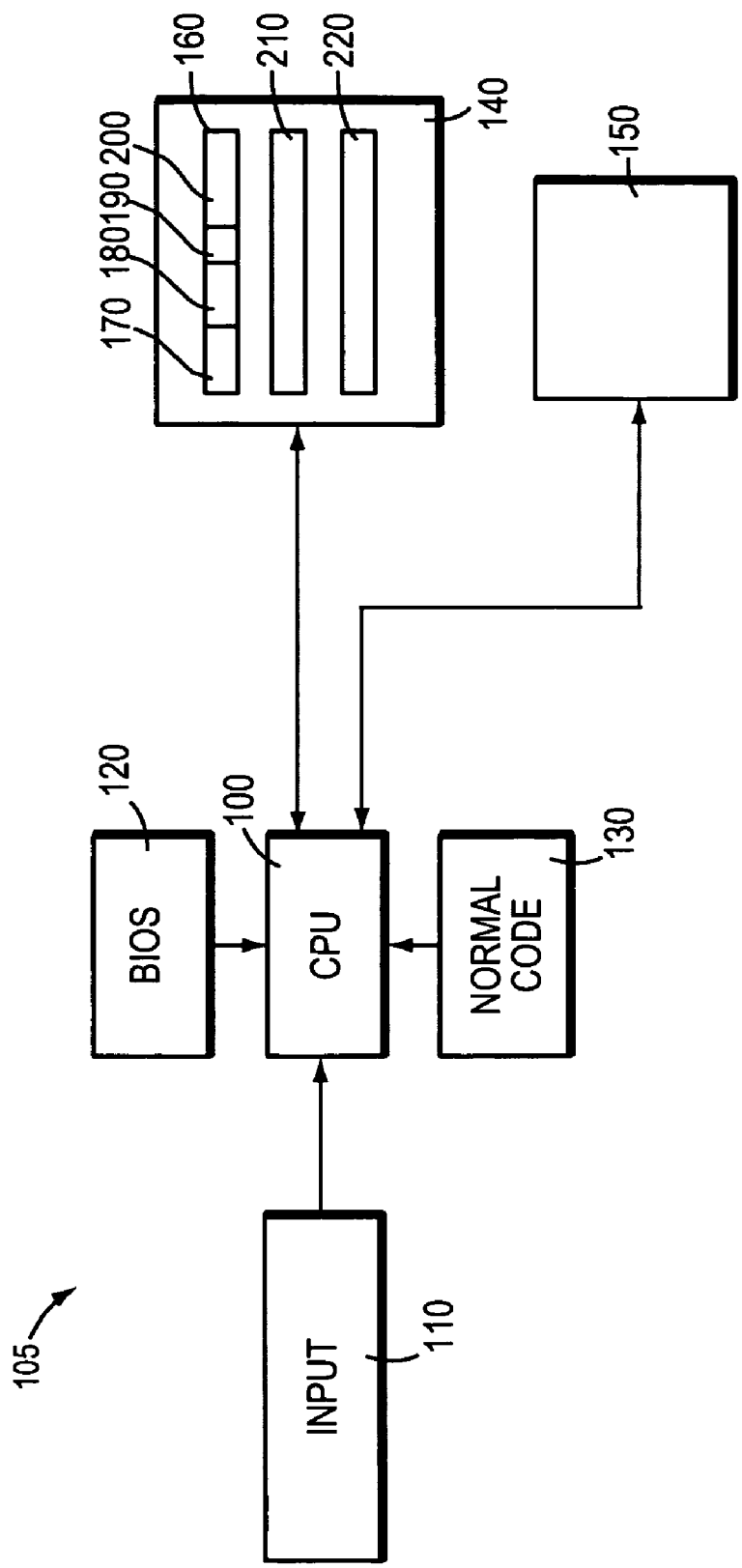
FIG. 1 is a block diagram of a CPU-based system.

FIG. 1 illustrates a system 105 in which a CPU 100 may respond to an input 110 by executing BIOS instructions 120 and/or normal code instructions 130, to interact with a volatile memory 140 and a nonvolatile memory 150. (In at least some implementations, at least some of instructions 130 may be stored in memory 140.) In particular, CPU 100 may respond to input 110 (which may be or include a high priority interrupt) by executing BIOS instructions 120 and other instructions to cause data to be saved from memory 140 to memory 150.

Figure 3:
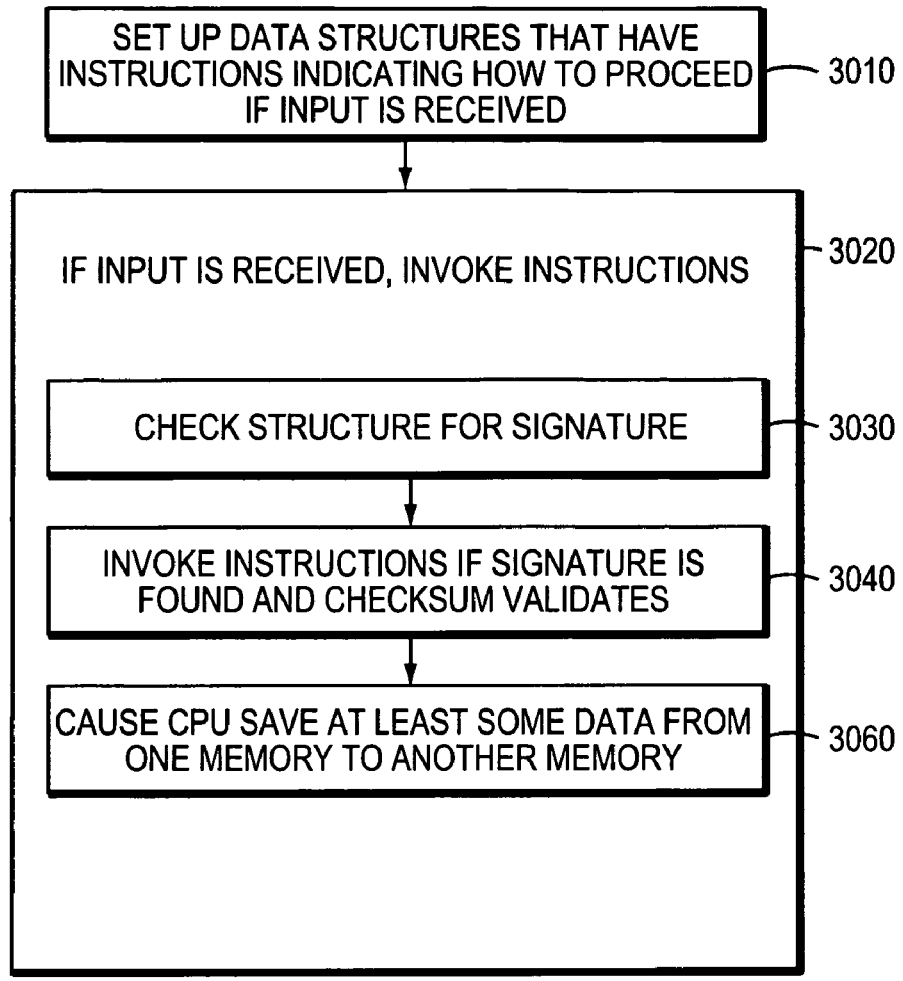
FIG. 3 is a flow diagram of a procedure that may be used with the CPU-based system of FIG. 1.

With respect also to FIG. 3, when the system is running normally, it may set up one or more data structures that indicate how to proceed in the event input 110 is received (step 3010). For example, the data structures may include structure 160 that includes a signature 170 (e.g., hexadecimal AA55), a length 180, a checksum 190 for the length, and executable instructions 200 having a length indicated by length 180. If input 110 is received, instructions 120 or other instructions may be invoked (step 3020) and executed as follows: structure 160 may be checked for signature 170 (step 3030); if signature 170 is found, and checksum 190 validates length 180 (step 3040), instructions 200 are executed (3050).

A variation of structure 160 may be used. For example, all or part of structure 160 may be stored in one or more registers of CPU 100, in BIOS 120, and/or in normal code 130.

In at least some implementations, input 110 is produced as a result of a reset and/or a watchdog timer.

With respect again to FIG. 3, execution of instructions 200 may cause CPU 100 to save at least some data from memory 140 to memory 150 (step 3060). For example, memory 140 may have write data 210 that has not yet been written to a persistent memory, and may have other write data 220 that has already been written to a persistent memory. In at least one implementation, instructions 200 cause CPU 100 to save data 210 but not data 220 to memory 150.

Thus in at least one implementation if power fails or a watchdog timer fires, input 110 is produced, causing instructions 200 to be executed to save data 210 to memory 150.

In the event of a power failure or other failure in the system, as long as input 110 can be produced and CPU is functioning and has adequate access to BIOS 120 and memories 140, 150, data may be saved from memory 140 to memory 150. Thus, in such a case, even if the system's disks are inaccessible and/or normal code 130 is inoperative, data 210 can be saved to memory 150.

In a power failure situation, the system's backup power supply need only power the system long enough for instructions 200 to save data as necessary from memory 140 to memory 150 (e.g., a few minutes).

In at least one implementation, instructions 200 may be loaded into the system together with normal code 130, in which case instructions 200 may be updated (e.g., with a new version) any time normal code 130 is re-loaded, which may be whenever the system boots up.

If adequately supported by other functionality where needed, instructions 200 may be used to perform other tasks instead or in addition, such as sending a message or otherwise issuing a notification of an event, resetting the system (e.g., if power returns after data 210 has been saved to memory 150), and/or shutting down the system (e.g., to avoid unnecessary battery drain after a power failure).

In at least some cases in which a reset produces input 110, it is expected that memory 140 remain preserved (powered up with contents unchanged) through execution of the reset procedure and at least long enough after reset so that instructions 200 can be executed.

Memory 150 may be or include magnetic disk memory and/or flash memory, and in at least some cases may include the system's disks normally used by normal code 130, as long as such disks are sufficiently operable during execution of instructions 200 to allow, for example, data 210 to be saved to the disks. Thus, if a portion of normal code 130 stops functioning, data 210 can be saved to disks as long as execution of instructions 200 is not dependent on the non-functional portion.

The techniques may be used in and/or with any data storage system having a write cache and a persistent storage device, for example, in and/or with a data storage system as now described.

The data storage system example makes reference to a power failure situation but it is to be understood that the techniques may be used any of many different other system failure situations.

Data may be moved within a data storage system from a storage cache (e.g., memory 140) into a persistent storage device (e.g., memory 150) in response to a power failure signal (e.g., input 110). The data may be moved from the storage cache to the flash-based memory vault by relying on a relatively-small backup power source, e.g., a battery that only powers a storage processor. With the storage processor still running from the backup power source (e.g., a dedicated battery), the storage processor is capable of moving the contents of the storage cache to the flash-based memory vault thus preserving data integrity of the data storage system so that no data is ever lost.

Figure 2:
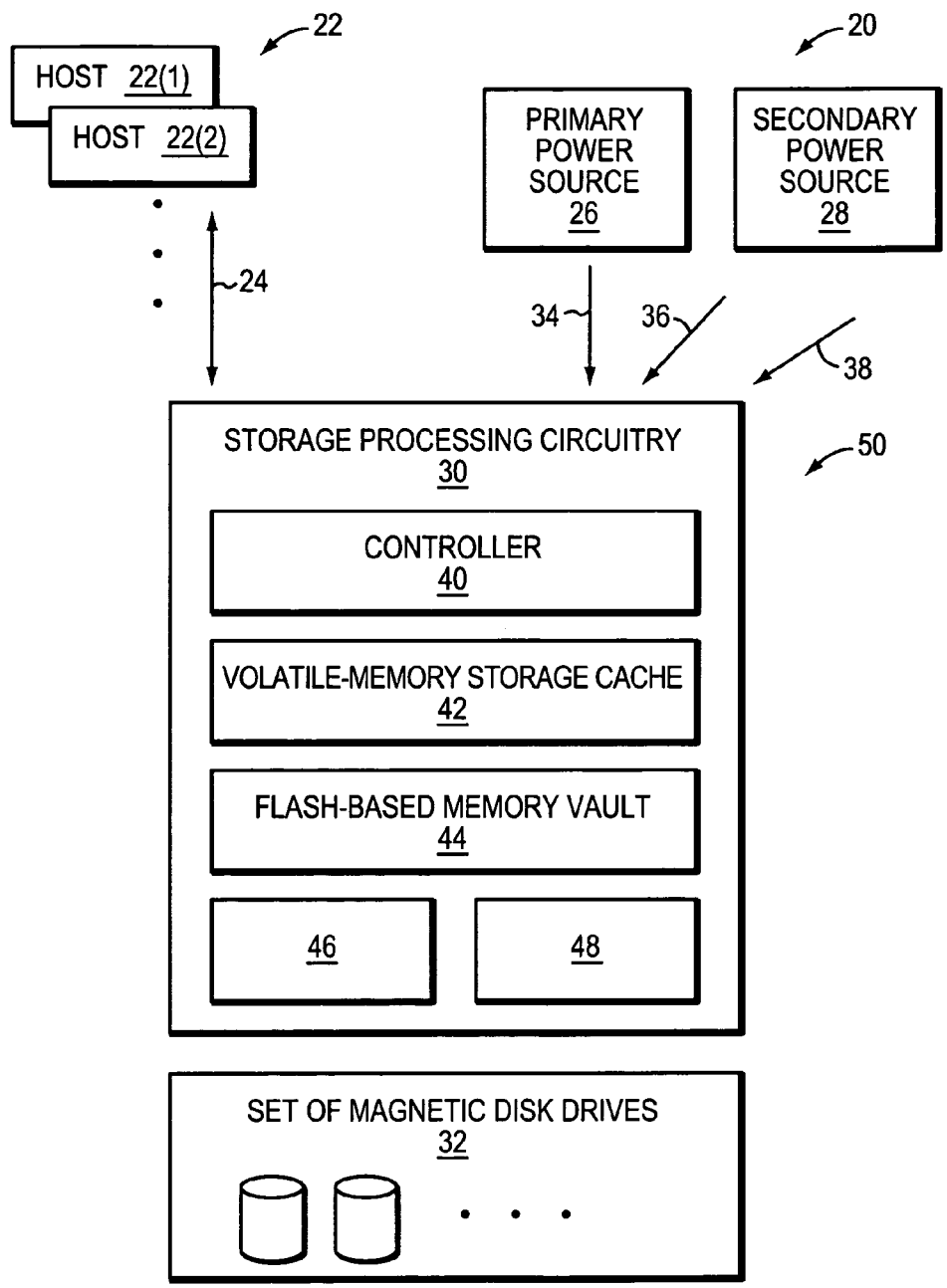
FIG. 2 is a block diagram of a data storage system which utilizes the CPU-based system of FIG. 1.

FIG. 2 shows a data storage system 20 which is configured to manage data behalf of a set of hosts 22(1), 22(2), . . . (collectively, hosts 22). In particular, the data storage system 20 exchanges communications signals 24 with at least one host 22 to perform a variety of data storage operations (e.g., read, write, read-modify-write, etc.).

As shown in FIG. 2, the data storage system 20 includes a primary power source 26, a secondary power source 28, storage processing circuitry 30 and a set of magnetic disk drives 32 (i.e., one or more magnetic disk drives 32). The primary power source 26 (e.g., a set of power supplies which connects to an external main power feed) is configured to provide primary power 34 to the storage processing circuitry 30 under normal conditions. The secondary power source 28 (e.g., a set of batteries) is configured to provide backup power 36 to the storage processing circuitry 30 in the event of a loss of primary power 34.

As further shown in FIG. 2, the storage processing circuitry 30 is configured to receive a power failure signal 38 (e.g., input 110) which indicates whether the storage processing circuitry 30 is running off of primary power 34 or backup power 36. In some arrangements, the power failure signal 38 is a power supply signal from the primary power source 26 or from the secondary power source 28. In other arrangements, the power failure signal 38 is a separate signal, e.g., from a sensor connected to the main power feed.

The storage processing circuitry 30 includes a controller 40 (e.g., CPU 100), a volatile (i.e., not persistent) memory storage cache 42 (a data storage cache between 100 MB to 1 GB) (e.g., memory 140), a flash-based memory vault 44 (e.g., memory 150), a clock generator circuit 46, and isolation circuitry 48. While the controller 40 is being powered by the primary power source 28, the controller 40 performs data storage operations on behalf of the set of hosts 22 using the volatile-memory storage cache 42 and the set of magnetic disk drives 32. For example, when a host 22 sends the controller 40 a request to write data, the controller 40 stores the data in volatile memory 42 and then, in parallel to scheduling the data to be written to the magnetic disk drives 32, conveys the completion of the write data request to the host 22. As a result, the write request completes to the host 22 as soon as the data is written to the volatile-memory storage cache 42 which takes less time than writing the magnetic disk drives 32.

Now, suppose that the controller 40 receives the power failure signal 38 indicating that the controller 40 is now being powered by the secondary power source 28 rather than by the primary power source 26. In this situation, primary power 34 from the primary power source 26 is no longer available but backup power 36 from the secondary power source 28 is available at least temporarily.

Accordingly, the controller 40 remains operational and moves data from the volatile-memory storage cache 42 to the flash-based memory vault 44 in response to the power failure signal 38. This may be accomplished using instructions 200 as described above with reference to FIG. 1. In particular, power failure signal 38 may serve as input 110 to trigger execution of instructions 200 to save data from cache 42 to vault 44.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for use in servicing memory in a system comprising a CPU, the method comprising:
    setting up a data structure comprising an instruction, a signature and information for validating the instruction, wherein the instruction comprises an executable instruction indicating how to proceed to invoke a service on receiving an input indicating a serious condition wherein the service runs on the CPU that is unaffected by the serious condition;
    in response to the input indicating the serious condition, invoking the service;
    by the service, determining whether the instruction is available to be executed on the same CPU, the instruction not being affected by the serious condition, the instruction being updatable with a new version when the system boots up;
    performing a validation check on the instruction by using information for validating the instruction from the data structure;
    by the same CPU executing the instruction, causing the same CPU to copy data from a write cache to a nonvolatile memory before the data is lost from the write cache, even when a normal code running on the same CPU is inoperative, the write cache also being used by the same CPU as a write cache for another memory; and
    by the service, determining whether the signature exists that indicates the instruction is available.

2. The method of claim 1, further comprising:
    by the service, analyzing a checksum validated data structure to determine whether the instruction is available.

3. The method of claim 1, further comprising:
    when copying data, distinguishing between write data that has not yet been written to persistent memory, and other write data that has already been written to persistent memory.

4. The method of claim 1, wherein the serious condition is indicated by a watchdog timer.

5. The method of claim 1, wherein the service executes from BIOS.

6. The method of claim 1, wherein the nonvolatile memory includes a flash memory.

7. The method of claim 1, wherein the nonvolatile memory includes magnetic hard disk memory.

8. The method of claim 1, further comprising:
    powering the write cache long enough for the data to be copied.

9. The method of claim 1, further comprising:
    loading the instruction into the system together with normal code.

10. The method of claim 1, further comprising:
    by the instruction, resetting the system.

11. The method of claim 1, further comprising:
    by the instruction, shutting down the system.

12. The method of claim 1, further comprising:
    preserving the write cache through execution of a reset procedure.

13. The method of claim 1, wherein the serious condition includes a power failure.

14. The method of claim 1, wherein the service includes an interrupt service routine.

15. A system, comprising a CPU, for use in servicing memory, the system comprising:
    first logic setting up a data structure comprising an instruction, a signature and information for validating the instruction, wherein the instruction comprises an executable instruction indicating how to proceed to invoke a service on receiving an input indicating a serious condition wherein the service runs on the CPU that is unaffected by the serious condition;
    second logic invoking, in response to the input indicating the serious condition, the service;
    third logic determining, by the service, whether the instruction is available to be executed on the same CPU, the instruction not being affected by the serious condition, the instruction being updatable with a new version when the system boots up;
    validation logic performing a validation check on the instruction by using information for validating the instruction from the data structure;
    fourth logic, by causing the same CPU to execute the instruction, causing the same CPU to copy data from a write cache to a nonvolatile memory before the data is lost from the write cache, even when a normal code running on the same CPU is inoperative, the write cache also being used by the same CPU as a write cache for another memory; and
    fifth logic determining, by the service, whether the signature exists that indicates the instruction is available.

16. The system of claim 15, further comprising:
    sixth logic analyzing, by the service, a checksum validated data structure to determine whether the instruction is available.

* * * * *